United States Patent Office 3,025,645
Patented Mar. 20, 1962

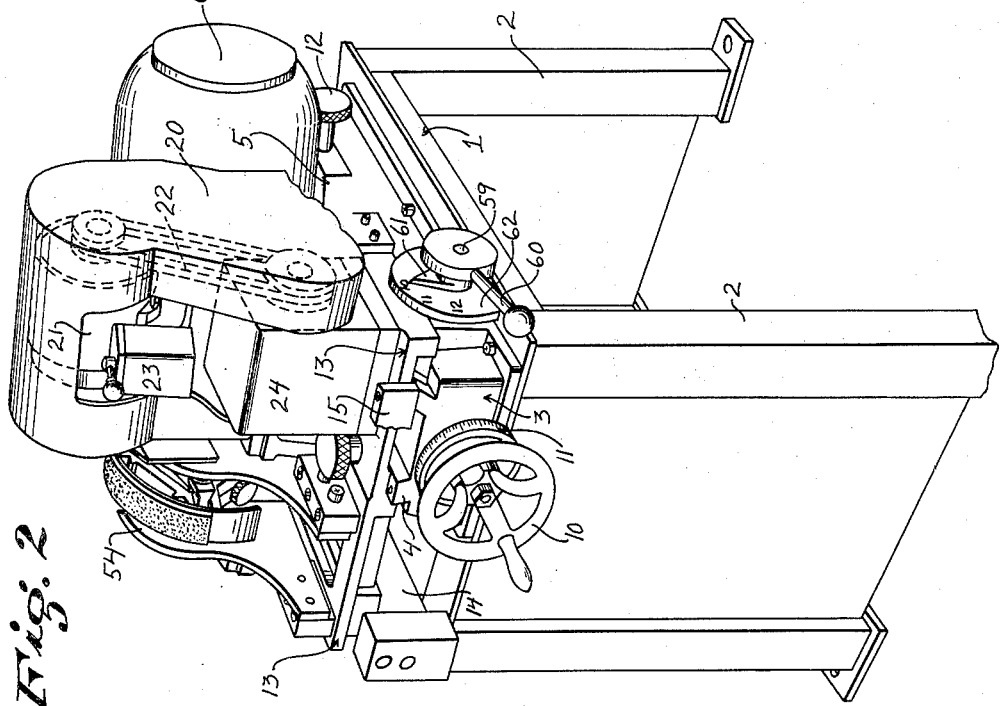

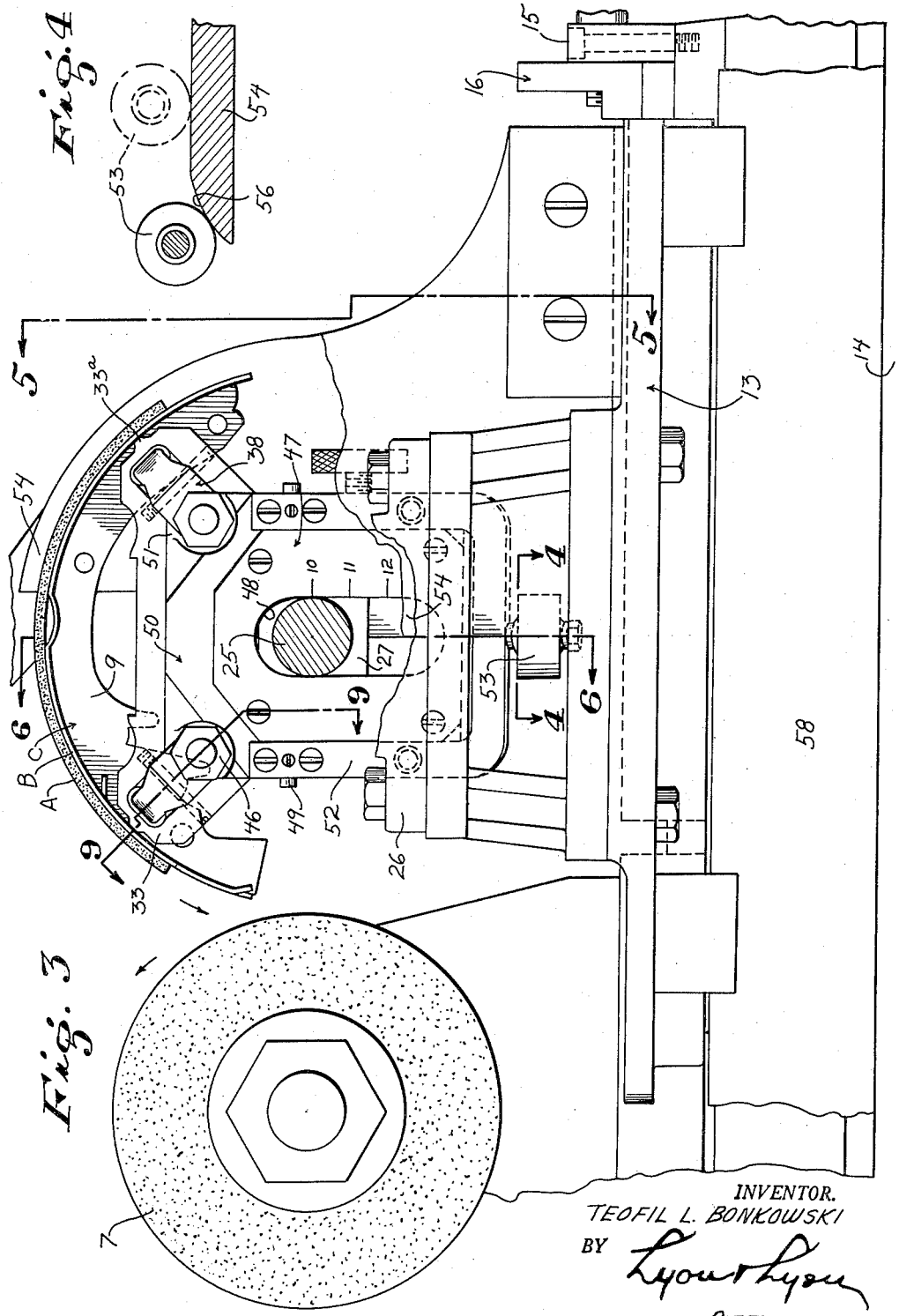

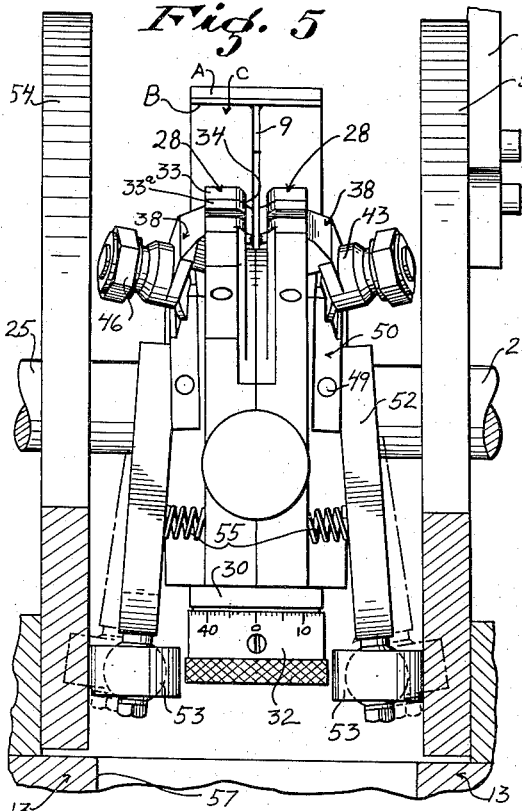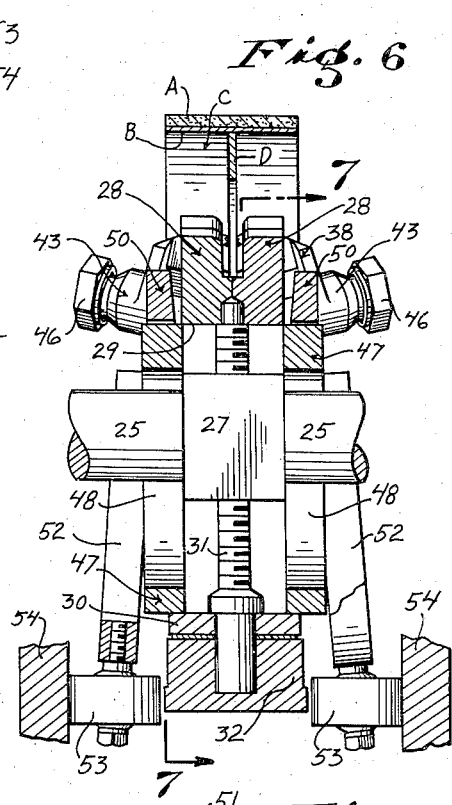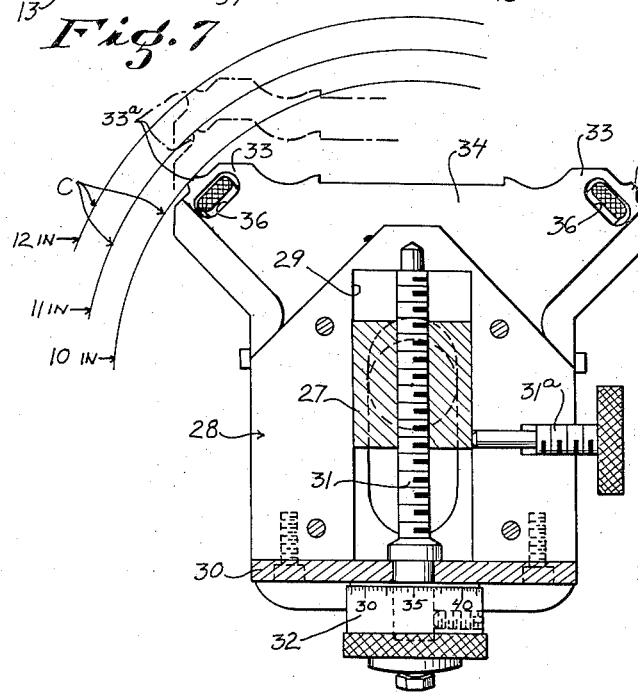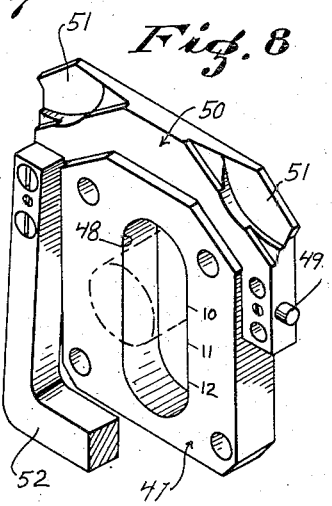
INVENTOR.
TEOFIL L. BONKOWSKI
BY
ATTORNEYS

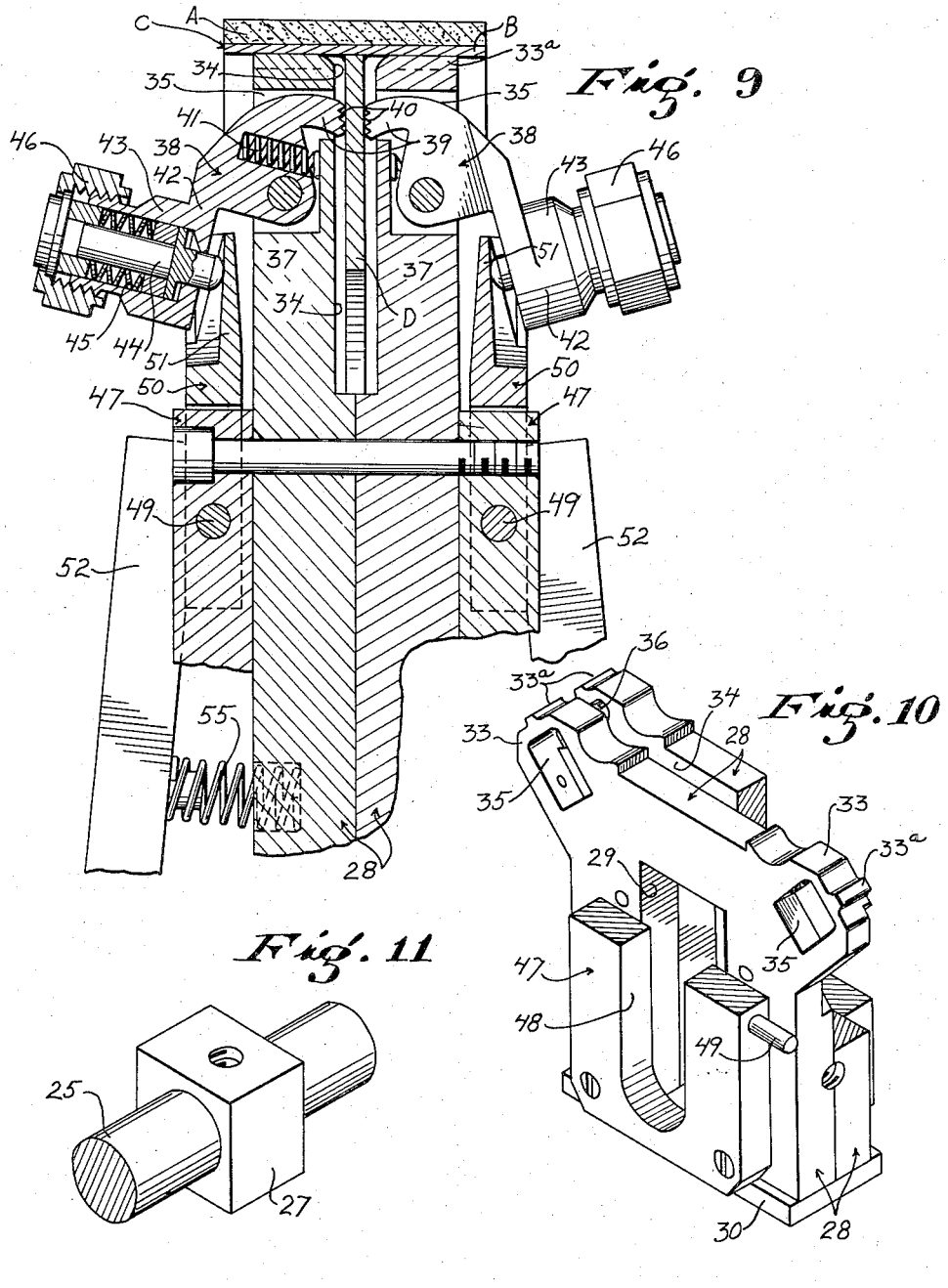

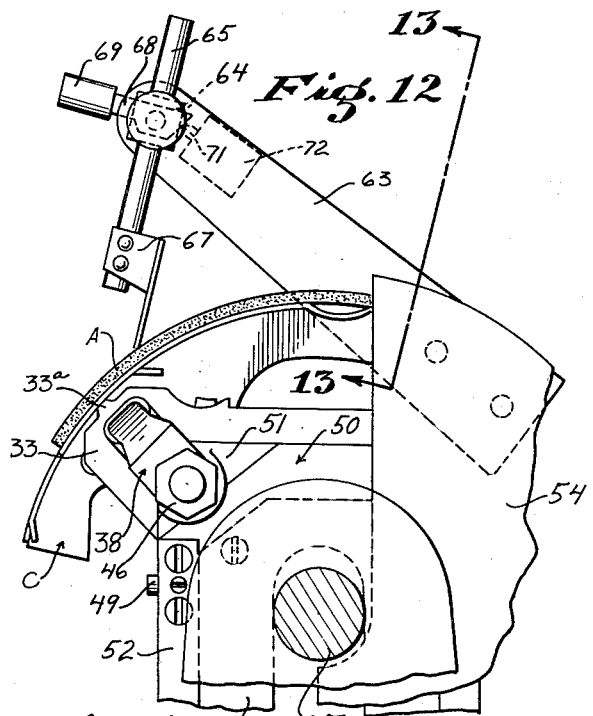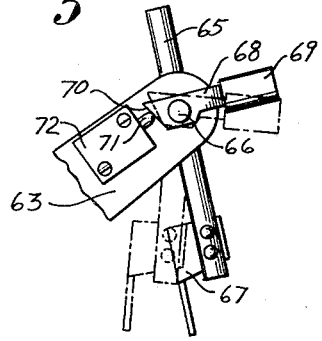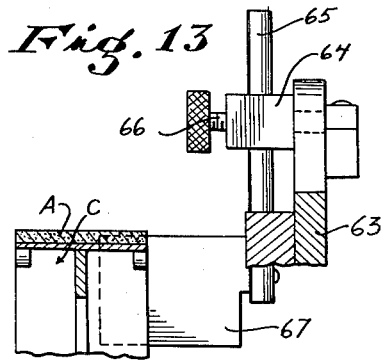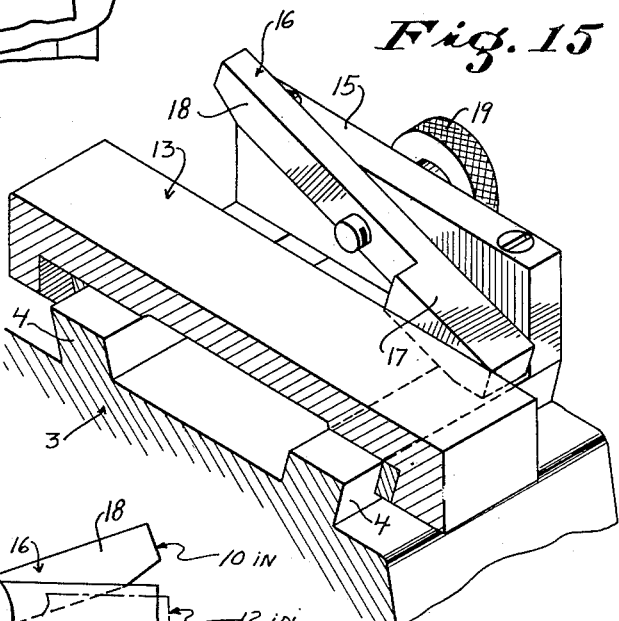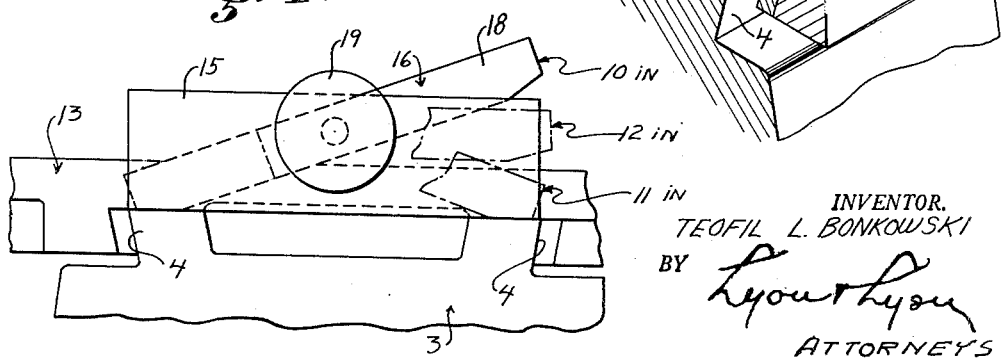

3,025,645
BRAKE LINING GRINDER
Teofil L. Bonkowski, Los Angeles, Calif., assignor of one-half to Frank R. Barnhisel and one-half to Brake & Automotive Sales, a corporation of California, both of Los Angeles, Calif.
Filed Nov. 10, 1959, Ser. No. 852,031
6 Claims. (Cl. 51—105)

This invention relates to brake lining grinders, and included in the objects of this invention are:

First, to provide a brake lining grinder which is particularly adapted to grind brake linings after they have been bonded to brake shoes so that the brake linings define true cylindrical surfaces of accurate diameter thereby to ensure proper fit within a brake drum.

Second, to provide a brake lining grinder which may be readily adjusted initially for accurate operation to close tolerances, and thereafter operated even by an inexperienced workman while holding to the previously adjusted settings.

Third, to provide a brake lining grinder which may be readily and quickly changed to accommodate brake linings of different selected diameters without affecting the original adjustment.

Fourth, to provide a brake lining grinder which incorporates a novel automatic chucking mechanism, which rotates the brake shoe and lining relative to a grinding wheel and which automatically opens after completion of the grinding operation to discharge the finished brake shoe and lining, and remains open to receive another brake shoe and lining; then automatically clamps the brake shoe for movement of the lining past the grinding wheel, whereby an operator is needed only to load the brake shoes and lining into the chucking mechanism.

With the above and other objects in view, as may appear hereinafter, reference is directed to the accompanying drawings in which:

FIGURE 1 is a perspective view of the brake lining grinder taken from the side thereof;

FIGURE 2 is another perspective view thereof taken principally from the front;

FIGURE 2A is a fragmentary sectional view showing the rack and pinion disposed under the brake shoe carriage;

FIGURE 3 is an enlarged, fragmentary, sectional view taken substantially through 3—3 of FIGURE 1, showing the brake lining and brake shoe mounted in the clutching mechanism and showing also the grinding wheel;

FIGURE 4 is a fragmentary sectional view through 4—4 of FIGURE 3 showing the camming means for control of the chucking means;

FIGURE 5 is a fragmentary sectional view through 5—5 of FIGURE 3 showing the chucking means in its closed position;

FIGURE 6 is another fragmentary sectional view of the chucking means taken through 6—6 of FIGURE 3;

FIGURE 7 is a fragmentary sectional view of the chucking means with the brake shoe omitted taken through 7—7 of FIGURE 6;

FIGURE 8 is a fragmentary perspective view of one of the chuck jaw operating frames;

FIGURE 9 is an enlarged sectional view through 9—9 of FIGURE 3 showing particularly the chucking levers;

FIGURE 10 is a fragmentary perspective view of the chucking frames;

FIGURE 11 is a fragmentary perspective view of the drive shaft for rotating the chucking means;

FIGURE 12 is a fragmentary sectional view corresponding to FIGURE 3, but showing particularly a safety control device to prevent the grinding operation in the event that the brake shoe and lining are not properly positioned;

FIGURE 13 is a fragmentary sectional view through 13—13 of FIGURE 12;

FIGURE 14 is a fragmentary sectional view of the safety means taken from a direction opposite to that of FIGURE 12;

FIGURE 15 is a fragmentary perspective view of the bed and brake shoe carriage, showing the manner of adjusting the position of the carriage for different diameters of brake shoes;

FIGURE 16 is a fragmentary end view thereof.

The brake lining grinder is mounted on a table 1 having legs 2. Supported on the top of the table 1 is a main bed 3 having dovetail ways 4. Slidably mounted on the main bed 3 is a motor carriage 5 which supports a motor 6 having a horizontally extending shaft, at the end of which is mounted a grind wheel 7. The grind wheel is enclosed in a suitable housing 8 having an exhaust tube 9 which may be connected to a suction line to carry away the grindings.

At the forward end of the main bed 3, that is, at the end thereof opposite from the motor 6, is a handwheel 10 which is connected to a screw shaft (not shown). The screw shaft coacts in a conventional manner with a traveler nut (not shown), which is secured to the motor carriage 5, so that rotation of the handwheel 10 moves the motor carriage back and forth on the main bed 3 in a conventional manner. A suitable dial 11 is mounted with the handwheel 10 on the screw shaft so that accurate adjustment of the position of the motor carriage 5 may be attained. A lock screw 12 secures the motor carriage 5 in any of its adjusted positions.

Mounted on the main bed 3 forwardly of the motor carriage 5 is a brake shoe carriage 13. The brake shoe carriage 13 includes a laterally extending part which rests on and is guided by a secondary bed or guide bar 14 mounted at one side of the table 1.

Secured at the forward end of the main bed 3, as shown in FIGURES 1, 2, 15, and 16, is a stop plate 15, in back of which is located a stop bar 16 having a wide end 17 and a narrow end 18. The center of the stop bar 16 receives the stem of a lock screw 19 which extends through the stop plate 15.

The stop bar 16 is capable of occupying three positions, as shown in FIGURE 16, so that the brake shoe carriage 13 may bear against either the wide end 17 or the narrow end 18 of the stop bar 16, or clear the stop bar and engage the stop plate 15. These three positions of the brake shoe carriage 13 enable the carriage to be positioned for the grinding of linings on 10", 11" and 12" diametered brake shoes, or other preselected sizes of brake shoes.

That portion of the brake shoe carriage 13 located over the main bed 3 carries a housing structure 20 which encloses a motor 21 and drive belt 22. A motor control switch 23 may be mounted in conventional relation to the housing structure 20.

Mounted on the brake shoe carriage 13, forwardly of the housing structure 20, is a gear housing 24 having an input shaft connected with the drive belt 22. The motor housing 20 also includes a slow-speed output shaft 25 which extends laterally from the gear housing 24, parallel to the axis of the grind wheel 7. The extended end of the output shaft 25 is supported in an outboard bearing 26.

Mounted on or formed integrally with the output shaft 25 is a drive block 27. A pair of chucking frames 28 are provided which are secured together by transverse bolts. The frames are U-shaped in form and define a common slot 29. The open end of the slot is bridged by a retainer plate 30 joined to both chucking frames 28. The drive block 27 fits within the slot 29 and forms a drive connection for rotating the chucking frames 28. An adjusting screw 31 extends through the drive block 27 and through the retainer plate 30. The protruding end of the adjusting screw is provided with a dial head 32. Rotation of the adjusting screw 31 moves the chucking frames 28 in a direction transversely to the axis of the output shaft 25.

The two chucking frames 28 are provided at their two corners opposite from the retainer plate 30 with outwardly diverging horns 33 which are circumferentially disposed approximately 90° from each other, depending upon the position of the drive block 27 in the slot 29. Each horn 33 is provided with a radially outwardly directed centering boss 33a.

Each opposed pair of horns 33 defines therebetween a channel 34 which receives the web of a brake shoe to be described hereinafter. Each horn 33 is provided with a recess 35, the radially outer portion of which penetrates through the horn to form a hole 36. Each recess 35 is provided with a transverse journal pin 37 which receives a chucking lever 38. Each chucking lever includes a clamp arm 39 terminating in a circumferentially extending portion which extends through a corresponding hole 36.

Two pairs of chucking levers 38 are provided and their clamp arms 39 terminate in serrations 40 which engage opposite sides of the brake shoe web. The chucking levers 38 are provided with springs 41 which urge the clamp arms 39 away from each other. Each chucking lever is provided with an operating arm 42 which extends in the opposite direction from the clamp arm 39, that is, radially inward toward the drive block 27.

Each operating arm 42 terminates in a tubular boss 43 in which is slidably mounted a plunger pin 44. Each pin is urged in a direction toward its chucking frame 28 by means of a series of Bellevue washers 45. An adjusting nut 46 is screw-threaded on the outer end of each tubular boss 43 so as to vary the load imposed on the plunger pin 44 by the Bellevue washers 45.

Secured on opposite sides of the chucking frames 28 are mounting plates 47. The mounting plates have elongated slots 48 which clear the shaft 25. Each mounting plate 47 supports a pair of laterally extending coaxial pivot pins 49. Each pair of pivot pins journals a U-shaped saddle 50 which arches over but clears one end of the corresponding mounting plate 47. Each saddle 50 is provided with diverging ears 51 which project between the plunger pins 44 and the chucking frames 28. Pivotal movement of the saddles 50 move the chucking levers 38 between a clamping position and a releasing position, as will be described in more detail hereinafter.

Joined to the extremities of each saddle 50 is a U-shaped yoke 52. The cross portions of the two yokes 52 extend across and clear the opposite sides of the dial head 32. Secured to the cross portion of each yoke 52 is a roller 53.

Secured to the brake shoe carriage 13, on opposite sides of and clearing the chucking frames 28 and the associated assembly is a pair of cam plates 54 which are slotted to clear the shaft 25. The cam plates 54 extend from the front side of the brake shoe carriage 13 and terminate in a plane extending approximately vertically through the axis of the output shaft 25.

The spacing of the cam plates 54 is such that when the rollers 53 pass therebetween, as shown in FIGURES 5 and 6, the chucking levers 38 occupy their clamping position, as shown in FIGURE 9. When the rollers clear the cam plates 54, they are urged outwardly by springs 55 to the broken line position shown in FIGURE 5, so as to release the chucking levers 38. The edges of the cam plates 54 engaged by the rollers 53 during movement in a direction to activate the chucking levers 38 are beveled or cammed, as indicated by 56 in FIGURE 4 of the drawings.

The brake shoe carriage 13 is provided with a discharge slot 57 located under the chucking mechanism so that the brake shoe and lining may be dropped from the chucking mechanism. A laterally directed discharge chute 58 is supported by the table 1 under the slot 57.

Operation of the brake lining grinder is as follows:

The brake lining grinder is intended to grind the cylindrical surface of a brake lining A which has been previously bonded to the cylindrical backing rim B of a brake shoe C. The brake shoe C is provided with a radially inwardly directed web D which is utilized for the purpose of clamping the brake shoe in position.

When the chucking mechanism, including the chucking frames 28 and associated elements, is positioned with the horns 33 diverging upwardly, a brake shoe of appropriate diameter may be placed in the chucking mechanism in such a manner that the backing rim B of the brake shoe rests on the centering bosses 33a and the web D extends between the two pairs of clamp arms 39.

Rotation of the shaft 25 and chucking mechanism in a counterclockwise direction rotates the brake shoe and lining about the axis of the shaft 25 into tangency with the grind wheel 7. In the position shown in FIGURE 3, the brake shoe has just been clamped, or is about to be clamped, by the chucking levers 38. In any case, before the leading end of the brake lining A is engaged by the grind wheel 7, the brake shoe is firmly clamped.

The brake shoe and lining rotate slowly past the grind wheel 7 until the grinding operation is completed. The brake shoe on completion of the grinding operation is located below the shaft 25, and the rollers 53 move clear of the cam plates 54 so as to release the brake shoe; whereupon the brake shoe drops downwardly through the slot 57 and onto the chute 58. While the chucking levers 38 are in their open position, another brake shoe may be inserted for the grinding operation.

It is desirable to grind the lining of brake shoes having different diameters. Conventionally, the brake shoe diameters are nominally 10", 11", and 12". By adjustment of the screw 31 and use of the dial head 32, the chucking frame 28 may be moved diametrically relative to the axis of the shaft 25. To facilitate placement of the chucking mechanism, a mark may be scribed on the shaft 25, and appropriate scale markings be scribed on one of the mounting plates 47, as shown in FIGURE 3.

Also as shown in FIGURE 3, and in FIGURE 7, a set screw 31a may be provided to lock the chucking frames 28 relative to the drive block 27 and shaft 25. In addition, it is necessary that the brake shoe carriage 13 be adjusted along the main bed 3. This is accomplished by means of the stop plate 15 and stop bar 16.

As shown in FIGURES 15 and 16, the brake shoe carriage 13 may be moved to its forward position engaging the stop plate 15 to position the carriage for the grinding of 12" brake shoes. To grind 11" brake shoes, the narrow end 18 of the stop bar 16 is interposed between the carriage 13 and the stop plate 15. To grind 10" brake shoes, the wide end 17 of the stop bar 16 is interposed between the stop plate 15 and the brake shoe carriage 13.

After the brake shoe carriage 13 has been set in its appropriate position and the chucking frames 28 have been adjusted with respect to the shaft 25, the position of the motor carriage 5 is adjusted by use of the handwheel 10 so as to place the periphery of the grind wheel 7 at the proper distance from the axis of the shaft 25. Once the motor carriage 5 and the grind wheel 7 have been located in their adjusted positions, further adjustment for the handling of different preselected sizes of brake shoes is unnecessary. On wear of the grind wheel 7 or refacing of the grind wheel, the position of the motor carriage 5 is reset.

In order to facilitate movement of the brake shoe carriage 13, the underside of the carriage may be provided with a conventional rack 13a engaged by a pinion gear 13b. The pinion gear is mounted on a pinion gear shaft 59 which may carry a suitable hand lever 60. A pointer 61 cooperating with a dial 62 may be provided so as to indicate the setting of the carriage.

In order to prevent operation of the machine if the brake shoe is not properly positioned in the chucking mechanism, a signaling or motor shut-off device is provided, as shown best in FIGURES 1, 12, 13, and 14. This device is mounted on an arm 63 extending upwardly and rearwardly from one of the cam plates 54. The upper end of the arm 63 supports a transverse pivot shaft, at one end of which is mounted a block 64 through which extends a bar 65 disposed laterally with respect to the pivot shaft. The bar may be secured in any position by a set screw 66.

The lower end of the bar 65 is provided with a metal flag 67 which is adapted to ride against the surface of the brake lining, as indicated in FIGURE 12. Also mounted on the pivot shaft is an arm 68 which is provided with a weight 69 located so as to urge the flag 67 against the brake lining. The opposite end of the lever arm 68 is provided with a cam face 70 which engages a pin 71 extending from a position-sensitive switch 72, such as a Microswitch.

The bar 65 is so adjusted that if the surface of the brake lining projects radially an excessive distance from the axis of the shaft 25, the switch will be either opened or closed so as to operate an appropriate relay and operate a suitable warning signal, or shut off the motor 21 or both the motors 21 and 6.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. A grinder for brake lining mounted on an arcuate brake shoe having a radial web, comprising: a bed structure; a motor and grind wheel unit adjustably mounted on said bed structure; a carriage structure also mounted on said bed structure; a shaft carried by said carriage structure disposed parallel to the axis of said grind wheel; means for adjusting said carriage structure to place said shaft at preselected distances from said grind wheel; a brake-shoe chucking structure mounted on said shaft; means for adjusting said chucking structure radially of said shaft whereby said chucking structure accommodates brake shoes of different diameter to dispose said brake shoes in concentric relation with said shaft, and on rotation of said shaft a brake lining on said brake shoe passes substantially tangentially to said grind wheel; and automatic gripping means incorporated in said chucking structure said gripping means including opposed gripping levers pivotally mounted on axes traversing said shaft and having gripping ends engageable with opposite sides of said brake shoe web, releasing levers extending diametrically across said shaft, yieldable means interconnecting said gripping levers and releasing levers, and fixed cams engageable by said releasing levers positioned to effect spreading of said gripping levers to release a brake shoe when said brake shoe is in a position clear of said grind wheel, and to effect a gripping operation of said gripping levers prior to and during movement of said brake shoe past said grind wheel.

2. A grinder for brake lining mounted on an arcuate brake shoe having a radial web, comprising: a bed structure; a motor and grind wheel unit adjustably mounted on said bed structure; a carriage structure also mounted on said bed structure; a shaft carried by said carriage structure disposed parallel to the axis of said grind wheel; means for adjusting said carriage structure to place said shaft at preselected distances from said grind wheel; a brake-shoe chucking structure mounted on said shaft; means for adjusting said chucking structure radially of said shaft whereby said chucking structure accommodates brake shoes of different diameter to dispose said brake shoes in concentric relation with said shaft, and on rotation of said shaft a brake lining on said brake shoe passes substantially tangentially to said grind wheel; jaws carried by said chucking structure for gripping the web of said brake shoe; cam and cam follower means operable to cause said jaws to grip said web during passage of said brake lining past said grind wheel, and thereafter to release said web to permit removal of said brake shoe.

3. A grinder for brake lining mounted on an arcuate brake shoe having a radial web, comprising: a grind wheel; a shaft confronting said grind wheel; a chucking mechanism mounted on said shaft and including means for positioning a brake shoe in concentric relation to said shaft; means for rotating said shaft to pass the lining on said brake shoe substantially tangentially to said grind wheel; and automatic gripping means incorporated in said chucking mechanism said gripping means including opposed gripping levers pivotally mounted on axes traversing said shaft and having gripping ends engageable with opposite sides of said brake shoe web, releasing levers extending diametrically across said shaft, yieldable means interconnecting said gripping levers and releasing levers, and fixed cams engageable by said releasing levers positioned to effect spreading of said gripping levers to release a brake shoe when said brake shoe is in a position clear of said grind wheel, and to effect a gripping operation of said gripping levers prior to and during movement of said brake shoe past said grind wheel.

4. A grinder for brake lining mounted on an arcuate brake shoe having a radial web, comprising: a grind wheel; a shaft confronting said grind wheel; means for positioning said shaft at different preselected distances from said grind wheel corresponding to different diameters of brake shoes; a brake-shoe chucking mechanism including a drive block mounted on said shaft, a chucking frame radially slidable relative to said block and having circumferentially spaced stops engageable with a brake shoe, radially operable micrometer screw means engageable with said drive block to move said frame radially to position brake shoes of different diameters engaging said stops in concentric relation with said shaft, means for gripping the web of a brake shoe positioned by said chucking mechanism said gripping means including opposed gripping levers pivotally mounted on axes traversing said shaft and having gripping ends engageable with opposite sides of said brake shoe web, releasing levers extending diametrically across said shaft, yieldable means interconnecting said gripping levers and releasing levers, and fixed cams engageable by said releasing levers positioned to effect spreading of said gripping levers to release a brake shoe when said brake shoe is in a position clear of said grind wheel, and to effect a gripping operation of said gripping levers prior to and during movement of said brake shoe past said grind wheel.

5. A grinder for brake lining mounted on an arcuate brake shoe having a radial web, comprising: a grind wheel; a shaft confronting said grind wheel; means for positioning said shaft at different preselected distances from said grind wheel corresponding to different diameters of brake shoes; a chucking mechanism mounted on said shaft and including means for positioning a brake shoe, means for adjusting said positioning means radially of the shaft to locate brake shoes of different diameters in concentric relation to said shaft, and means for gripping the web of a brake shoe; and means engageable by said brake shoe lining in the event said brake shoe is not seated on said positioning means for stopping at least said shaft.

6. A grinder for brake lining mounted on an arcuate brake shoe having a radial web, comprising: a grind wheel; a shaft confronting said grind wheel; means for positioning said shaft at different preselected distances from said grind wheel corresponding to different diameters of brake shoes; a brake-shoe chucking mechanism mounted on said shaft and adapted to accommodate brake shoes of different diameters; means for adjusting said chucking mechanism to position brake shoes of different diameters in concentric relation to said shaft; means for gripping the web of a brake shoe positioned by said chucking mechanism; cam means operable as said shaft is rotated to release said gripping means for removal of a brake shoe, and substitution of a like brake shoe during a preselected portion of a revolution of said shaft; and brake lining, position-sensing means operable in the event said brake shoe is not seated in said chucking mechanism to stop rotation of said shaft.

References Cited in the file of this patent

UNITED STATES PATENTS

| | | |
|---|---|---|
| 588,249 | Sperry | Aug. 17, 1897 |
| 2,032,864 | Begg et al. | Mar. 3, 1936 |
| 2,637,145 | Wasley | May 5, 1953 |
| 2,734,319 | Billeter | Feb. 14, 1956 |
| 2,744,365 | Parker | May 8, 1956 |